W. M. C. FOSTER.
BICYCLE.
APPLICATION FILED NOV. 17, 1914.
1,189,929.
Patented July 4, 1916.
2 SHEETS—SHEET 1.
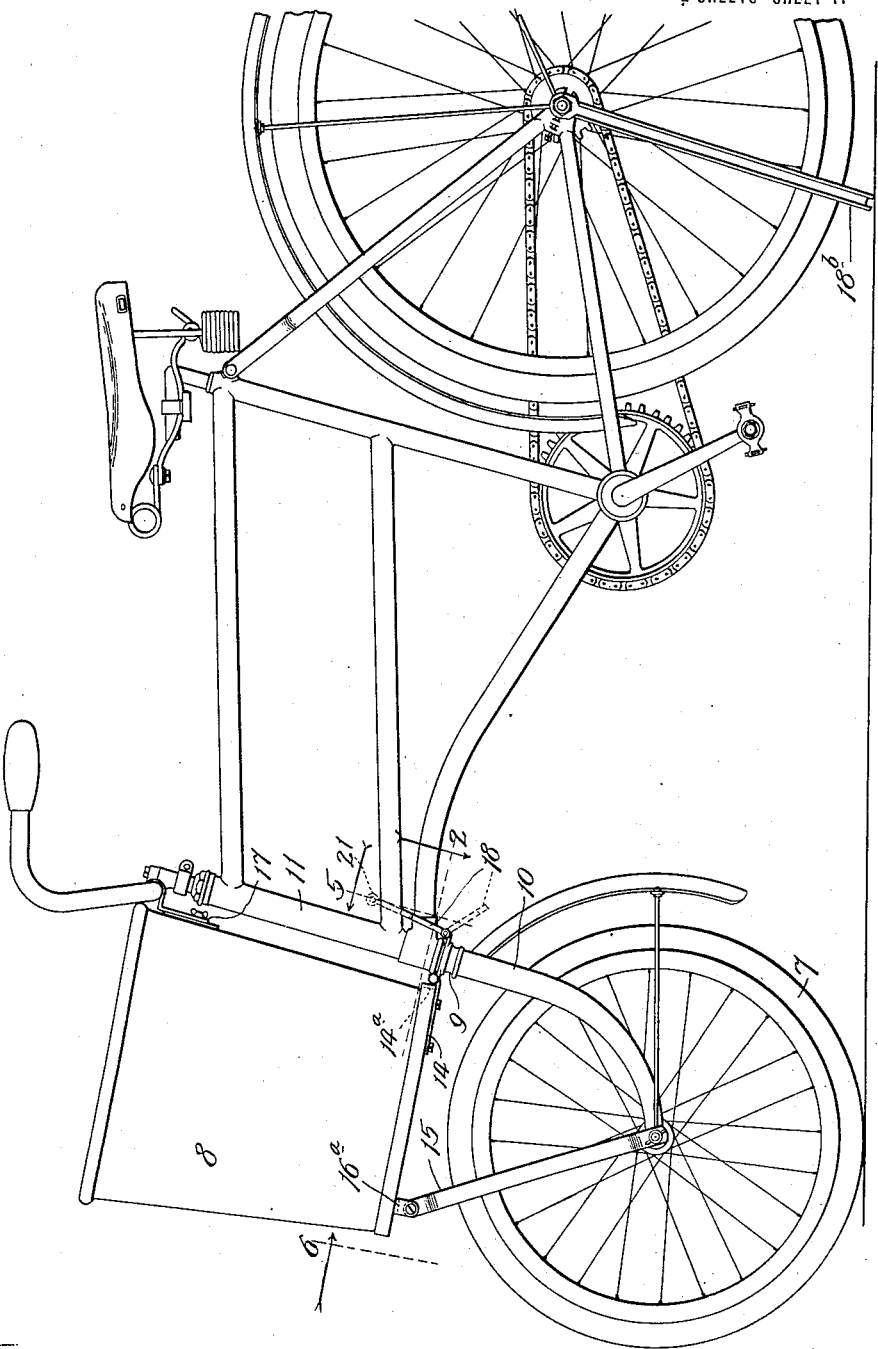

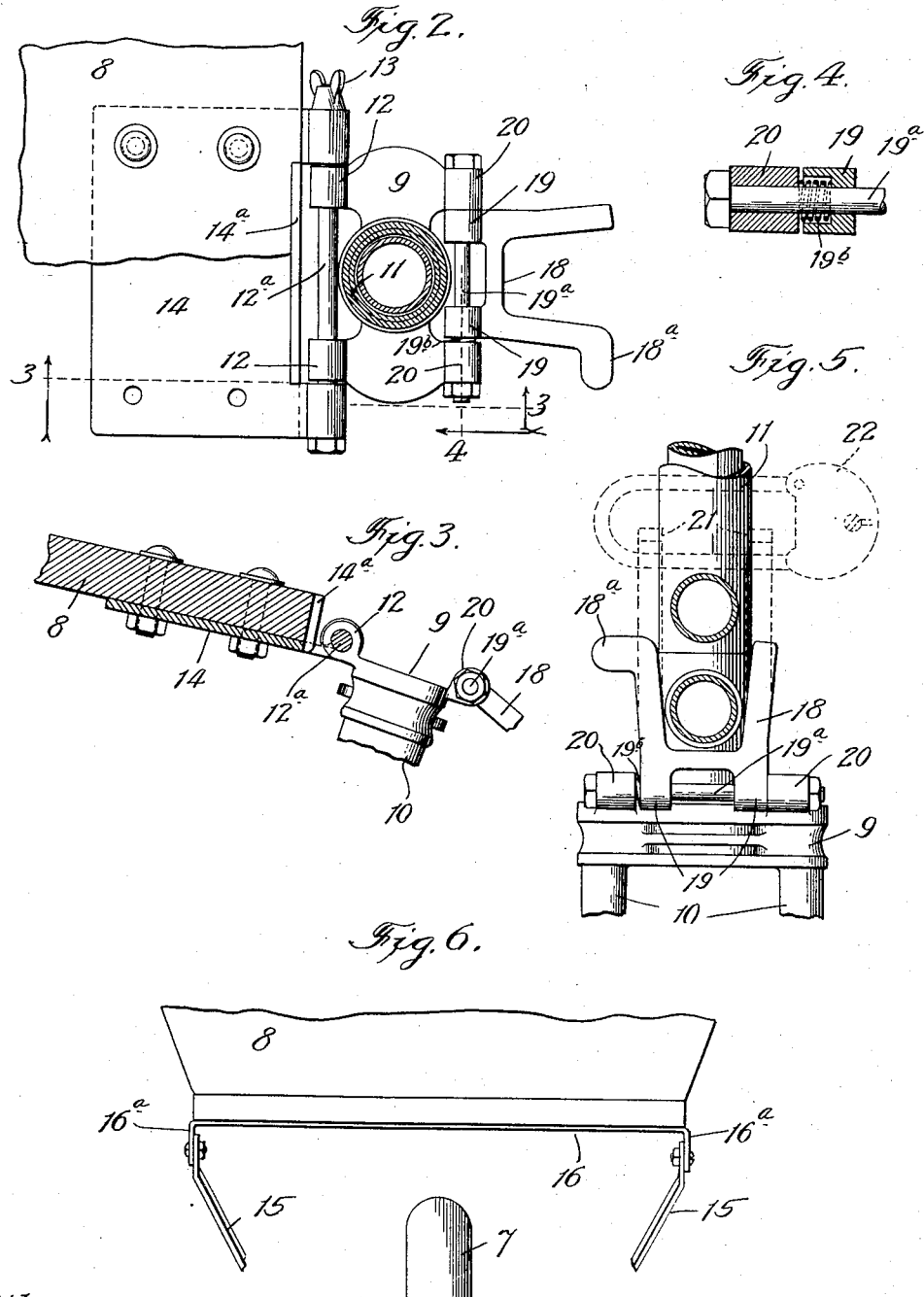

UNITED STATES PATENT OFFICE.

WILLIAM M. C. FOSTER, OF CHICAGO, ILLINOIS, ASSIGNOR TO MEAD CYCLE CO., OF CHICAGO, ILLINOIS, A CORPORATION OF ILLINOIS.

BICYCLE.

1,189,929. Specification of Letters Patent. Patented July 4, 1916.

Application filed November 17, 1914. Serial No. 872,538.

*To all whom it may concern:*

Be it known that I, WILLIAM M. C. FOSTER, a citizen of the United States, residing at Chicago, in the county of Cook and State of Illinois, have invented a new and useful Improvement in Bicycles, of which the following is a specification.

The primary object of my invention is to provide an improved construction of package-carrying means on a bicycle (including a motorcycle); and it is my further object to provide improved means for preventing the steering mechanism, when the bicycle is standing, from turning the front wheel, for the purposes hereinafter explained.

In the accompanying drawings, Figure 1 is a view, partly broken, showing a bicycle in side elevation provided with my improvements; Fig. 2 is an enlarged section on line 2, Fig. 1; Fig. 3 is a broken view of a section on the irregular line 3—3, Fig. 2; Fig. 4 is an enlarged section taken on line 4, Fig. 2, to show a spring-pressed detail; Fig. 5 is a broken view in sectional elevation, the section being taken on line 5, Fig. 1 and enlarged, and Fig. 6 is a broken view in elevation regarded in the direction of the arrow on line 6, Fig. 1.

The bicycle proper illustrated in Fig. 1 is of well known general construction. The front wheel 7, however, is shown smaller in diameter than the rear wheel to bring the center of gravity of the load in a package-carrier 8 as low as possible. The crown 9, from which the stem of the front fork 10 extends and is rotatably confined in the tubular head 11, is provided on its front side with a pair of hinge-knuckles 12, 12, forming bearings for a pintle rod $12^a$ having one end headed and carrying a thumb-nut 13 on the opposite end. A ledge or platform 14 is hinged on the rod $12^a$, to form a support for the receptacle 8 and is fastened by the nut. This platform has a section of its rear edge cut out and turned up to form a back $14^a$. The package-holder, which may be a basket or other desired form of receptacle, is secured through its bottom, as by bolts, on the platform, the back $14^a$ being shown to be let into the rear edge of the bottom to afford supplemental means for holding the package-carrier rigidly in place; and for supporting the latter at its forward part, props 15 are extended from opposite ends of the forward axle into pivotal engagement with ears $16^a$ on the ends of a bar 16 fastened to the lower face of the carrier-bottom. A bracket 17 is shown (Fig. 1) to extend from the handle bar stem and to be releasably secured to the back of the parcel-carrier near its upper end.

By the described construction, a simple and light, but strong support for the package-carrier is provided in position to bring the center of gravity of the load as low as possible over the front steering wheel 7; and the support being fastened directly to the rotatably steering mechanism, the load necessarily turns with the fork 10, in steering, and thus always extends in the direction of forward travel of the bicycle, whereby tendency to overbalance is avoided.

It is desirable to provide a bicycle with means for holding the steering mechanism against turning when the bicycle is standing. This is particularly the case with a package-carrying bicycle, since when the rider stops to deliver a package, leaving the bicycle standing, as at a curb, propped only by the usual rear-wheel support shown at $18^b$ in Fig. 1, the load on the front end is liable to turn the fork 10 and with it the front wheel, overbalancing the bicycle and causing it to fall. Moreover, whether the bicycle be equipped with package-carrying means, or not, it is desirable, when it is left standing, to render the steering mechanism inoperative for preventing the bicycle from being ridden off by a purloiner. For either of these purposes the crown affords a desirable support for an adjustable holder, which is shown in the form of a fork 18 provided with a pair of hinge-knuckles 19 journaled on a headed nut-fastened pintle-rod $19^a$ having its bearings in knuckles 20, 20 cast on the rear face of the crown.

When a rider leaves the bicycle standing, he may turn the fork 18 from the position indicated by dotted lines in Fig. 1, in which it extends normally, to that shown by full lines, wherein it straddles the lower member of the bicycle-frame and thereby holds the fork 10 against turning, thus preventing turning of the front wheel and package-carrier correspondingly and resultant overbalancing and falling of the bicycle. One prong of the fork 18 is shown to terminate in a lateral pedal-extension $18^a$ (Fig. 2) for engagement by a foot of the rider to enable him, after mounting, to lower the fork to its normal inoperative position by pressing his foot against the extension. To adapt the steering mechanism to be locked, when the rider leaves the bicycle standing, the fork 18 may be provided in the modified form indicated by dotted lines in Figs. 1 and 5. This modification consists in providing the prongs of sufficient length to extend across and embrace the middle bar of the bicycle frame, and with eyes 21 in their outer-end portions, through which to pass the shackle of a padlock 22, or other suitable locking-means.

The spiral spring 19$^b$ confined between adjacent knuckles 19 and 20 (Fig. 4) serves to yieldingly hold the fork 18 in its raised and lowered positions.

I realize that considerable variation is possible in the details of construction thus specifically shown and described, and I do not intend by illustrating a single, specific or preferred embodiment of my invention to be limited thereto; my intention being in the following claims to claim protection upon all the novelty there may be in my invention as broadly as the state of the art will permit.

What I claim as new and desire to secure by Letters Patent is:—

1. In a bicycle, a package-carrier support hinged on the crown of the front steering-fork to turn with the latter, a package-carrier fastened at its bottom on said support and having its upper portion connected with the handle-bars, and props extending from the front-wheel axle and hinged to the bottom of said carrier.

2. In a bicycle, hinge-knuckles on the forward side of the steering-fork crown, a package-carrier support having hinge-knuckles on its rear edge, a pintle-rod passing through the crown and support knuckles for connecting said support with the crown to turn with the latter, and props extending from the front-wheel axle to engage said carrier.

3. In a bicycle, hinge-knuckles on the forward side of the steering-fork crown, a package-carrier platform having hinge-knuckles on its rear edge, a pintle-rod passing through the crown and platform knuckles for connecting the platform with the crown to turn with the latter, a package-carrier fastened at its bottom on said support and having its upper portion connected with the handle-bars, and props extending from the front-wheel axle and pivotally connected with the bottom of said carrier toward the front thereof.

4. In a bicycle, a steering-fork crown having forward hinge-knuckles, a platform formed with a back and rear hinge-knuckles, a pintle-rod passing through the crown and platform knuckles for connecting the platform with the crown to turn with the latter, a package-carrier fastened on the platform against said back and having its upper portion connected with the handle-bars, ears depending from the bottom of said carrier, and props extending from the front-wheel axle and pivotally connected with said ears.

5. A bicycle having its steering-fork crown provided with hinge-knuckles on its forward and rear sides for hingedly connecting with the forward knuckles, a package-carrier support to turn with the steering-fork, and with the rear knuckles a fork to adapt it to be raised on its hinge to straddle the bicycle-frame and prevent the steering-fork from turning.

WILLIAM M. C. FOSTER.

In presence of—
  A. C. Fischer,
  F. M. Rondeau.

Copies of this patent may be obtained for five cents each, by addressing the "Commissioner of Patents, Washington, D. C."